US010367848B2

(12) United States Patent
Ito (10) Patent No.: US 10,367,848 B2
(45) Date of Patent: Jul. 30, 2019

(54) TRANSMITTING RELAY DEVICE IDENTIFICATION INFORMATION IN RESPONSE TO BROADCAST REQUEST IF DEVICE MAKING REQUEST IS AUTHORIZED

(71) Applicant: NEC Corporation, Minato-ku, Tokyo (JP)

(72) Inventor: Yo Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 174 days.

(21) Appl. No.: 15/507,788

(22) PCT Filed: Sep. 16, 2015

(86) PCT No.: PCT/JP2015/004710
§ 371 (c)(1),
(2) Date: Mar. 1, 2017

(87) PCT Pub. No.: WO2016/047105
PCT Pub. Date: Mar. 31, 2016

(65) Prior Publication Data
US 2017/0289195 A1 Oct. 5, 2017

(30) Foreign Application Priority Data

Sep. 25, 2014 (JP) ................................. 2014-195282

(51) Int. Cl.
*G06F 7/04* (2006.01)
*G06F 17/00* (2019.01)
(Continued)

(52) U.S. Cl.
CPC .......... *H04L 63/1483* (2013.01); *G06F 21/42* (2013.01); *G06F 21/44* (2013.01);
(Continued)

(58) Field of Classification Search
CPC ... H04L 63/1483; H04L 41/12; H04L 9/0838; H04L 61/6013; H04L 63/0281;
(Continued)

(56) References Cited

U.S. PATENT DOCUMENTS 6,092,105 A * 7/2000 Goldman ............... G06Q 30/04
709/217
8,949,949 B1 * 2/2015 Sella .................... H04L 63/0876
713/155

(Continued)

FOREIGN PATENT DOCUMENTS

JP 2004-312197 A 11/2004
JP 2006-165678 A 6/2006
(Continued)

OTHER PUBLICATIONS

International Search Report for PCT Application No. PCT/JP2015/004710, dated Dec. 1, 2015.
(Continued)

*Primary Examiner* — Aravind K Moorthy (57) ABSTRACT

Disclosed are a communication control device, etc. which can ensure the security of an information system without imposing any significant load. The communication control device 101 comprises: a first transmission unit 102 which, in response to a request from an information processing device 202 for identification information representing a relay device 203 for relaying communications, transmits identification information representing a second information processing device, which is different from the relay device 203, to the information processing device 202; and a second transmission unit 103 which transmits the identification information representing the relay device 203 to the information processing device 202 if software information about software that is to be transmitted by the information pro-
(Continued)

cessing device 202 on the basis of the identification information is authorized software information.

10 Claims, 9 Drawing Sheets (51) Int. Cl.
G06F 12/14 (2006.01)
H04L 9/32 (2006.01)
H04L 29/06 (2006.01)
G06F 21/44 (2013.01)
H04L 12/66 (2006.01)
G06F 21/62 (2013.01)
H04L 9/08 (2006.01)
H04L 29/12 (2006.01)
G06F 21/42 (2013.01)
G06F 21/60 (2013.01)
H04L 12/24 (2006.01)

(52) U.S. Cl.
CPC ............ *G06F 21/606* (2013.01); *G06F 21/62* (2013.01); *H04L 9/0838* (2013.01); *H04L 12/66* (2013.01); *H04L 41/12* (2013.01); *H04L 61/103* (2013.01); *H04L 61/1511* (2013.01); *H04L 61/6013* (2013.01); *H04L 61/6022* (2013.01); *H04L 63/0272* (2013.01); *H04L 63/0281* (2013.01); *H04L 63/0823* (2013.01); *H04L 63/0876* (2013.01); *H04L 63/166* (2013.01)

(58) Field of Classification Search
CPC . H04L 63/0272; H04L 61/1511; H04L 61/61; H04L 61/103; H04L 63/0823; H04L 61/6022; H04L 12/66; H04L 63/0876; H04L 63/166; G06F 21/42; G06F 21/606; G06F 21/62; G06F 21/44
USPC .......... 726/26, 12, 23; 713/168, 170
See application file for complete search history.

(56) References Cited

U.S. PATENT DOCUMENTS

| | | | |
|---|---|---|---|
| 2005/0007838 A1* | 1/2005 | Makela | G11C 15/00 365/199 |
| 2006/0090067 A1* | 4/2006 | Edmonds | H04L 63/083 713/159 |
| 2006/0123118 A1 | 6/2006 | Choe et al. | |
| 2006/0136724 A1 | 6/2006 | Takeshima et al. | |
| 2006/0155855 A1 | 7/2006 | Hamai | |
| 2009/0025058 A1* | 1/2009 | Courtay | H04L 63/10 726/3 |
| 2009/0109862 A1* | 4/2009 | Capello | H04L 45/02 370/242 |
| 2012/0278614 A1* | 11/2012 | Choi | G06F 21/32 713/159 |
| 2014/0140331 A1* | 5/2014 | Lee | H04L 63/10 370/338 |
| 2014/0157373 A1* | 6/2014 | Tanaka | H04L 63/0876 726/4 |
| 2014/0237544 A1* | 8/2014 | Higuchi | H04L 63/0884 726/3 |
| 2015/0067866 A1* | 3/2015 | Ibatullin | G06F 21/554 726/25 |
| 2015/0089621 A1* | 3/2015 | Khalid | H04L 63/08 726/9 |

FOREIGN PATENT DOCUMENTS

| | | |
|---|---|---|
| JP | 2006-191552 A | 7/2006 |
| JP | 2008-271242 A | 11/2008 |
| JP | 2009-100226 A | 5/2009 |

OTHER PUBLICATIONS

English translation of Written opinion for PCT Application No. PCT/JP2015/004710.

* cited by examiner

```
GET / HTTP/1.1
Accept: image/gif, image/jpeg, */*
Accept-Language: ja
Accept-Encoding: gzip, deflate
User-Agent: Browser/2.0 (Compatible; OSX ver. 7;)
Host: www.xxx.zzz
Connection: Keep-Alive
```

TRANSMITTING RELAY DEVICE IDENTIFICATION INFORMATION IN RESPONSE TO BROADCAST REQUEST IF DEVICE MAKING REQUEST IS AUTHORIZED

This application is a National Stage Entry of PCT/JP2015/004710 filed on Sep. 16, 2015, which claims priority from Japanese Patent Application 2014-195282 filed on Sep. 25, 2014, the contents of all of which are incorporated herein by reference, in their entirety.

TECHNICAL FIELD

The present invention relates to a communication control device and the like which control communication in a communication network.

BACKGROUND ART

If a personal computer (PC) accesses a target site for destination via a communication network, there is a case that PC may be guided to a site (for example, a specific Web site or a fake site) other than the target site.

For example, spoofing in ARP (Address Resolution Protocol) is a fake IP (Internet Protocol) to use another person's IP address. In the spoofing, a router (fake router) guiding to a fake site fakes its IP address to IP address assigned to a true router (original router), via which a PC accesses the target site. Consequently, PC is guided to the fake site by the access's passing via the fake router. As a result, PC cannot access any site other than the fake site.

Encryption techniques are examples of measures against the above-mentioned "spoofing" or against stealing information transmitted and received via the communication network.

However, in the case of transmitting and receiving encrypted information, it is difficult for a gateway relaying the encrypted information to provide a highly value-added service. For example, PTL 1 (Patent Literature 1) discloses a relay device for providing the highly value-added service even in the case of transmitting and receiving encrypted information. The relay device uses an encryption technique called "Split SSL (Secure Socket Layer)". The relay device decodes encrypted information transmitted based on Split SSL in the own device and provides a service by use of the decoded information.

Moreover, PTL 2 discloses an example of art using a spoofing. PTL 2 discloses a communication guiding device for reducing a load of a server in case of guiding communication. The communication guiding device guides communication by transmitting a fake ARP reply unless it has guided an IP address assigned to a source transmitting an ARP request. Then, the communication guiding device guides the communication by transmitting a DNS (domain name system) response representing an IP address of a server device for destination of the guidance in response to a DNS request guided by the fake ARP reply.

CITATION LIST

Patent Literature

PTL 1: Japanese Unexamined Patent Application Publication No. 2006-165678

PTL 2: Japanese Unexamined Patent Application Publication No. 2009-100226

SUMMARY OF INVENTION

Technical Problem

In accordance with the communication guiding device disclosed by PTL 2, it is not necessary to install a program into a client terminal and it is possible to guide communication carried out by the client terminal. However, in case of the communication guiding device, it is impossible to ensure security.

Therefore, a main object of the present invention is to provide a communication control device and the like which can ensure security of an information system without significant load.

Solution to Problem

In order to achieve the aforementioned object, as an aspect of the present invention, a communication control device including:

first transmission means for transmitting identification information of a second information processing device different from a relay device relaying communications to a first information processing device in response to a request for identification information of the relay device from the first information processing device; and second transmission means for transmitting identification information of the relay device to the first information processing device when software information transmitted by the first information processing device on basis of the identification information is authorized software information.

In addition, as another aspect of the present invention, a communication control method including:

transmitting identification information of a second information processing device different from a relay device relaying communications to a first information processing device in response to a request for identification information of the relay device from the first information processing device; and transmitting identification information of the relay device to the first information processing device when software information transmitted by the first information processing device on basis of the identification information is authorized software information.

Furthermore, the object is also realized by communication control program, and a computer-readable recording medium which records the program.

Advantageous Effects of Invention

According to the communication control device and the like of the present invention, it is possible to ensure security of the information system without significant load.

DESCRIPTION OF EMBODIMENTS OF INVENTION

Next, example embodiments for carrying out the present invention will be explained in detail with reference to drawings.

First Example Embodiment

Figure 1:
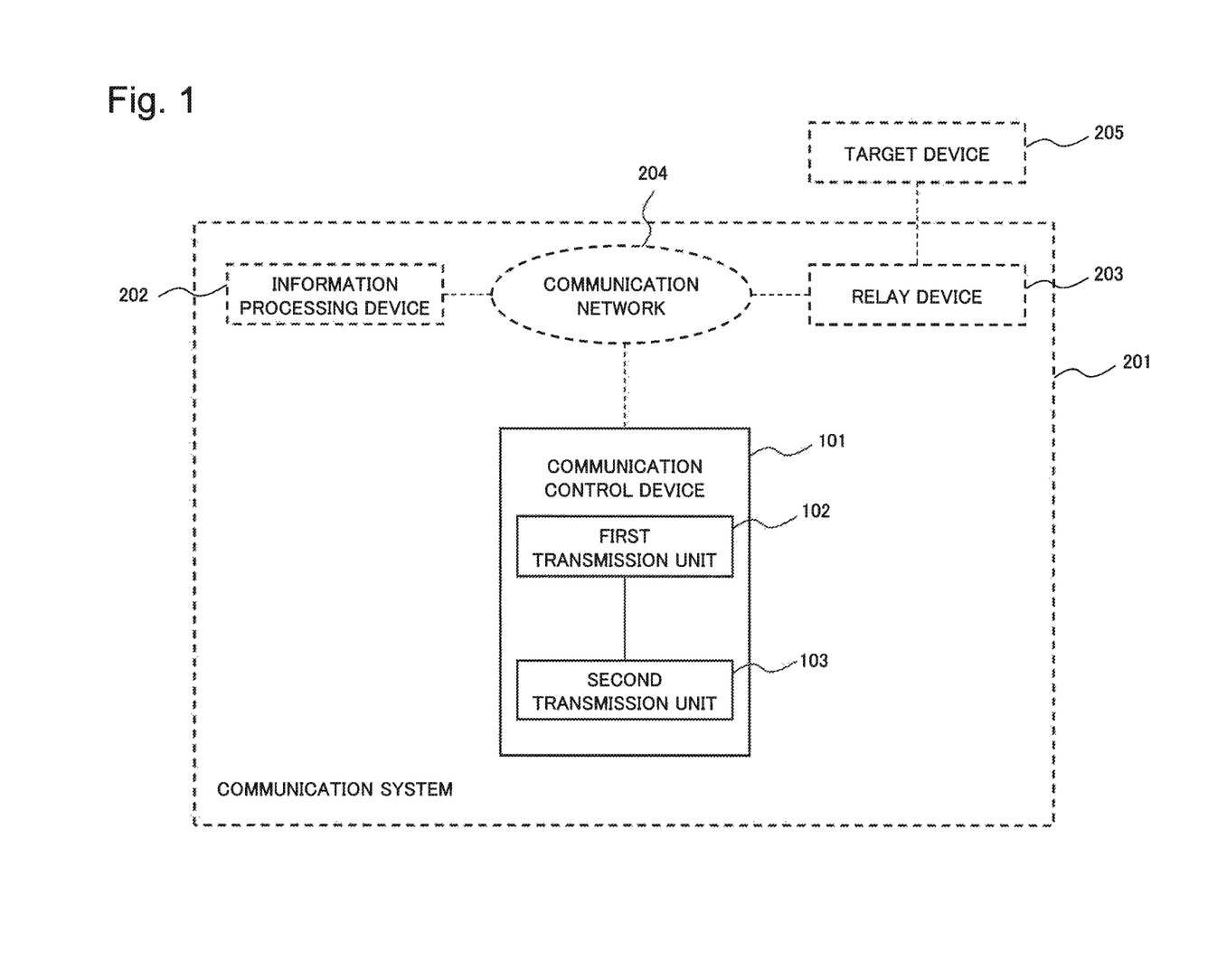
FIG. 1 is a block diagram showing the configuration of a communication control device according to a first example embodiment of the present invention.
Figure 2:
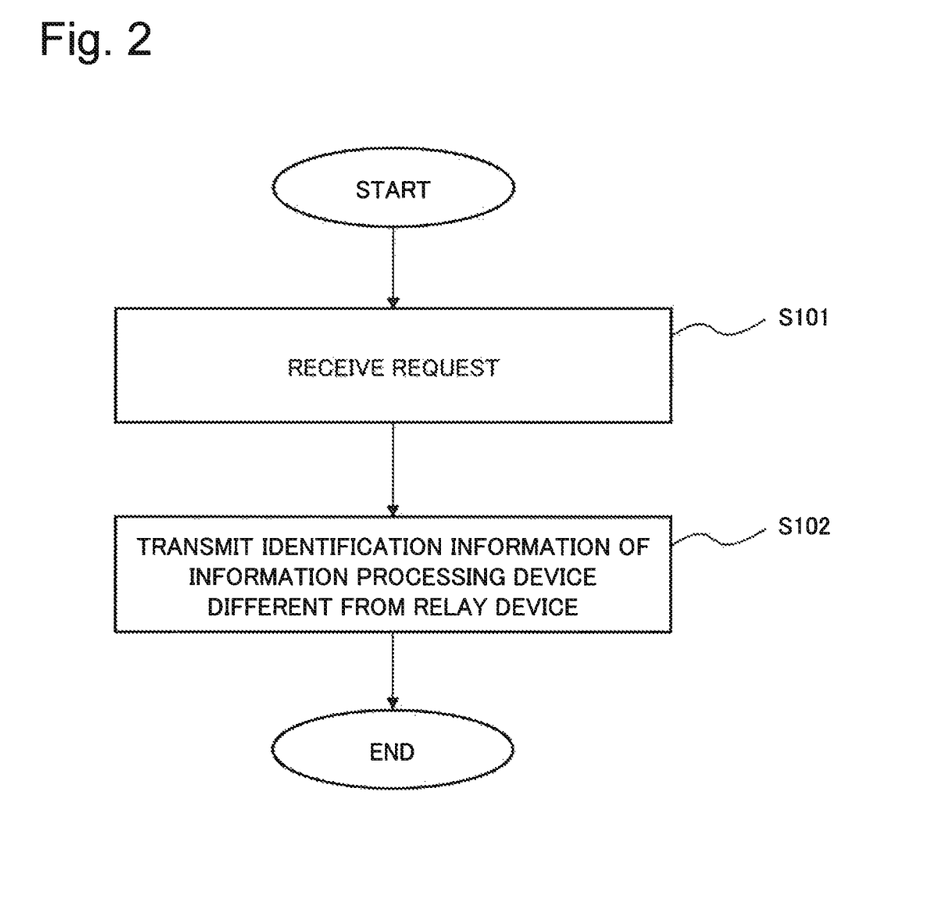
FIG. 2 is a flowchart showing a flow of processing in a first transmission unit according to the first example embodiment.
Figure 3:
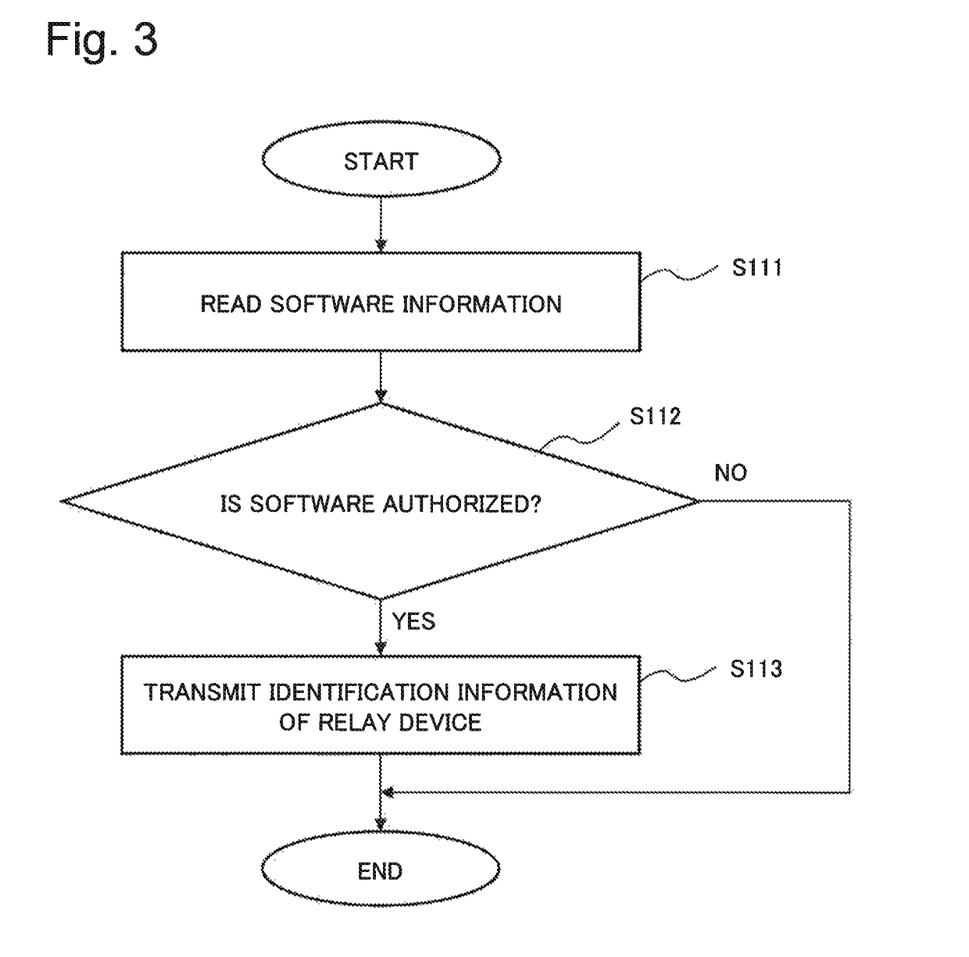
FIG. 3 is a flowchart showing a flow of processing in a second transmission unit according to the first example embodiment.
Figure 4:
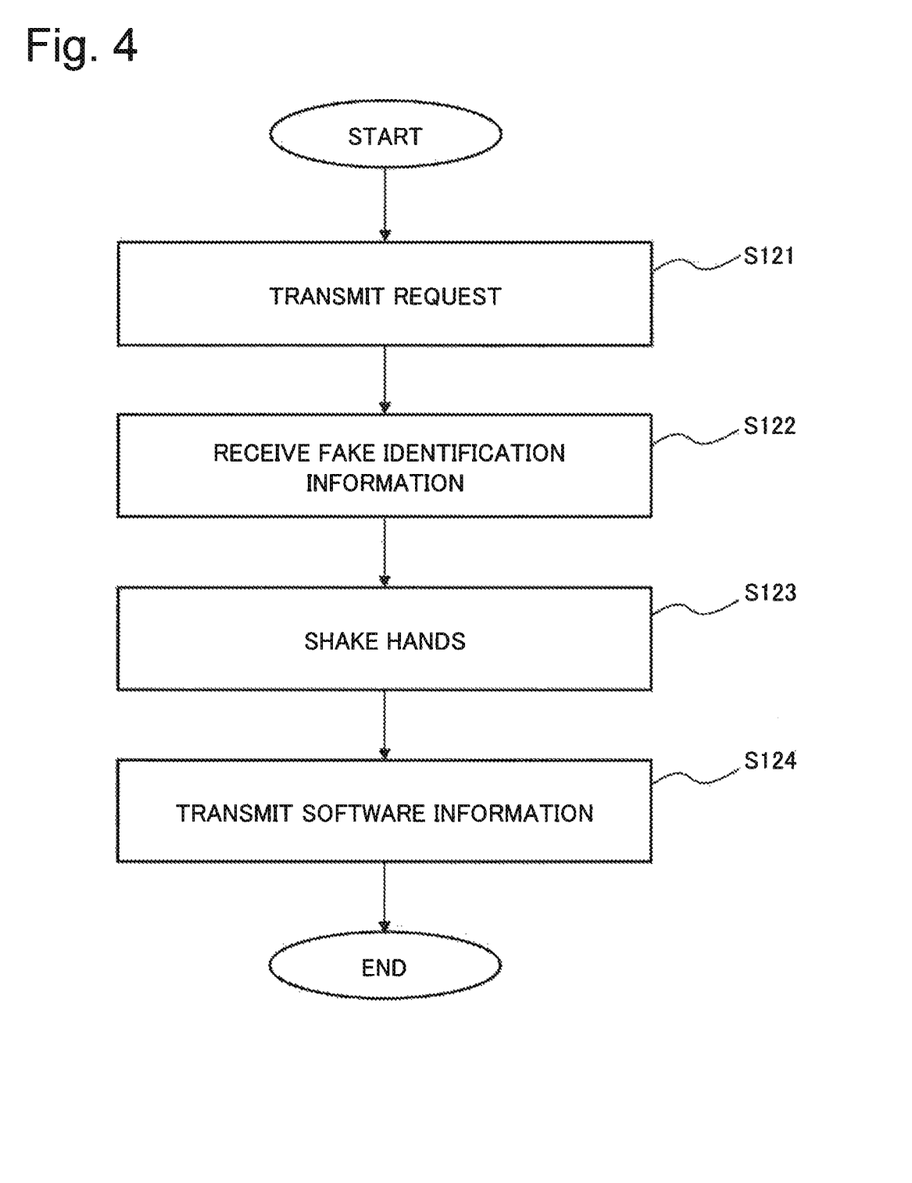
FIG. 4 is a flowchart showing a flow of processing in an information processing device.

A configuration of a communication control device 101 according to a first example embodiment of the present invention, and processing in the communication control device 101 will be explained in detail with reference to FIG. 1 to FIG. 4. FIG. 1 is a block diagram showing the configuration of the communication control device 101 according to the first example embodiment of the present invention. FIG. 2 is a flowchart showing a flow of processing in a first transmission unit 102 according to the first example embodiment. FIG. 3 is a flowchart showing a flow of processing in a second transmission unit 103 according to the first example embodiment. FIG. 4 is a flowchart showing a flow of processing in an information processing device 202.

Referring to FIG. 1, the communication control device 101 according to the first example embodiment includes the first transmission unit 102 and the second transmission unit 103.

A communication system 201 includes the communication control device 101, the information processing device 202 (hereinafter, denoted as "first information processing device" in some cases), a relay device 203 and a communication network 204. The communication control device 101, the information processing device 202 and the relay device 203 can communicate each other via the communication network 204. The relay device 203 is, for example, a gateway having a function to connect communication networks based on different communication protocols.

The information processing device 202 can communicate with a target device 205 via the relay device 203.

The information processing device 202 can communicate with the target device 205 that represents a target information processing device for communication, via the relay device 203. The communication control device 101, the information processing device 202 and the relay device 203 can communicate each other via the communication network 204.

Hereinafter, for convenience of explanation, it is assumed that the communication control device 101 connects to a communication network segment that the processing device 202 can communicate in the communication network 204. Accordingly, it is assumed that the communication control device 101 can detect a broadcast packet transmitted by the information processing device 202. Moreover, it is assumed that an information processing device such as the communication control device 101, the information processing device 202, the relay device 203, the target device 205 and the like are assigned identification information for specifying individual information processing devices.

Moreover, it is assumed that the information processing device 202 places confidence (trusts) in communication control processing by the communication control device 101. For example, in the case that the communication control device 101 issues certification information (certificate) on communication, it is assumed that the information processing device 202 trusts that the certification information is right information (or authorized information). That is, it is assumed that the information processing device 202 stores the certification information as trustworthy route certification information.

For example, by using the Web browser or the like, the information processing device 202 communicates with URL representing a specific communication destination (for example, the target device 205) via the communication network 204 in accordance with HTTPS.

Here, URL represents an abbreviation of Uniform Resource Locator.

Moreover, HTTPS represents an abbreviation of Hypertext Transfer Protocol Secure.

Referring to FIG. 4 indicating processing in the information processing device 202, the information processing device 202 for a target of communication control by the communication control device 101 communicates with the relay device 203 for relaying the communication with the target device 205 when the information processing device 202 tries to communicate with an destination information processing device (for example, the target device 205). Firstly, the information processing device 202 transmits a request for an inquiry about identification information of the relay device 203 to an information processing device connecting with the communication network 204 (Step S121).

The identification information is, for example, a MAC address. Moreover, the request is, for example, an ARP packet (ARP request). In this case, the information processing device 202 broadcasts the ARP request including an IP (Internet Protocol) address assigned to the relay device 203, to the information processing devices connecting with the communication network 204. That is, the information processing device 202 broadcasts the ARP request for an inquiry about the identification information of the relay device 203.

Here, ARP represents an abbreviation of Address Resolution Protocol.

Moreover, the MAC address represents an abbreviation of Media Access Control address.

The first transmission unit 102 in the communication control device 101 receives the request transmitted by the information processing device 202 (Step S101 of FIG. 2). In response to the request, the first transmission unit 102 transmits identification information (hereinafter, denoted as "fake identification information") representing an information processing device (hereinafter, denoted as "second information processing device", which is, for example, the communication control device 101, in some cases) different from the relay device 203 to the information processing device 202 (Step S102 of FIG. 2).

For convenience of explanation, it is assumed that the information processing device different from the relay device 203 is the communication control device 101. Here, the information processing device different from the relay device 203 may be a device other than the communication control device 101.

Explanation will be continued as follows with referring to an example applied to ARP. The first transmission unit 102 generates an ARP reply by associating an IP address in the ARP request, and a MAC address of the second information processing device (for example, the communication control device 101). The first transmission unit 102 transmits the generated ARP reply (hereinafter, denoted as "fake ARP reply") to the information processing device 202. That is, the fake ARP reply is a reply including the fake identification information of the second information processing device. The reply is transmitted to the information processing device 202 by the communication control device 101 in response to the ARP request for inquiring the identification information of the relay device 203.

Referring to FIG. 4, the information processing device 202 receives the fake identification information transmitted by the first transmission unit 102 (Step S122) and stores the identification information of the second information processing device as the identification information of the relay device 203, based on the received fake identification information. Accordingly, the information processing device 202 communicates according to the fake identification information.

Explanation will be continued as follows with referring to an example applied to ARP. The information processing device 202 receives the fake ARP reply as the fake identification information. The information processing device 202 generates ARP information, in which the IP address assigned to the relay device 203 and the fake identification information of the second information processing device are associated, based the received fake ARP reply. The ARP information is stored in a storage device (not shown in the drawing), for example, in an aspect of an ARP table. In the case that the information processing device 202 tries to communicate with the target device 205, the information processing device 202 specifies the identification information (in this case, the identification information of the second information processing device) associated with the IP address assigned to the relay device 203 in the ARP information. The information processing device 202 communicates with not the relay device 203 but the second information processing device represented by the specified identification information. For example, in the case that the second information processing device is the communication control device 101, the information processing device 202 communicates with the communication control device 101.

Next, the information processing device 202 and the communication control device 101 determine parameter values and the like required for controlling the communication. That is, the information processing device 202 and the communication control device 101 shake hands with each other (Step S123). For example, the information processing device 202 and the communication control device 101 shake hands with each other in accordance with SSL (Secure Sockets Layer).

Next, the information processing device 202 transmits software information such as types of software (for example, OS (operating system)) working in the information processing device 202, a version of the software, and the like to the second transmission unit 103 of the communication control device 101 (Step S124).

Figure 5:
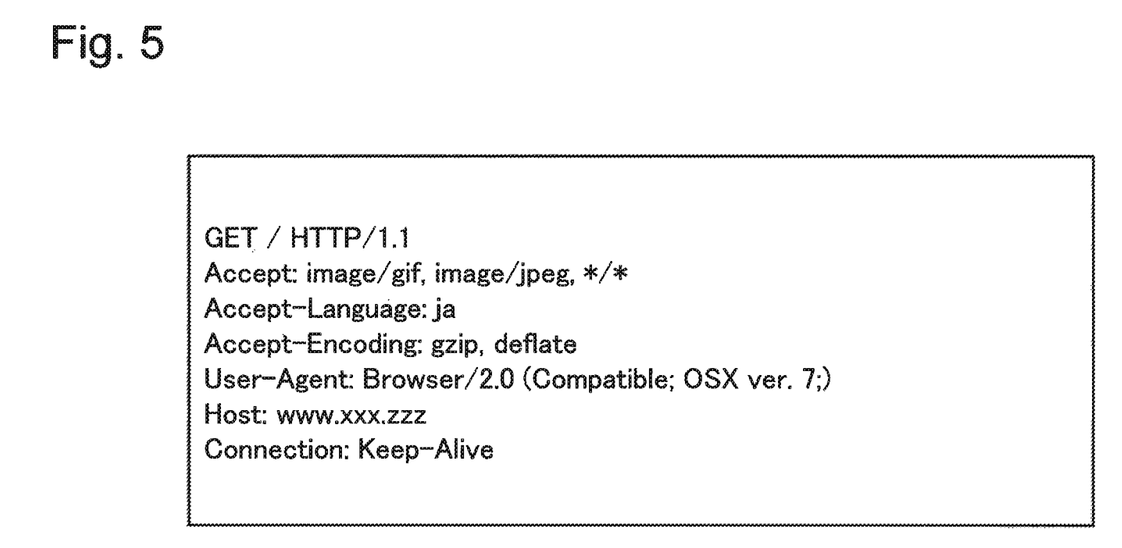
FIG. 5 is a diagram showing an example of HTTP messages.

For example, the software information is a HTTP (Hypertext Transfer Protocol) message which is exemplified in FIG. 5. FIG. 5 is a diagram showing an example of HTTP messages.

For convenience of explanation, it is assumed that the software information includes a type of OS and a version of the OS.

The HTTP message includes, for example, a parameter (GET) for a request of retrieving information, a parameter (Accept-Language) for representing language, a parameter (User-Agent) for representing an environment related to the information processing device 202, and the like. In the example shown in FIG. 5, "OSX" and "ver. 7" are described in an item of "User-Agent". This description represents that a type of OS is "OSX", and a version of the OS is 7.

Referring to FIG. 3, the second transmission unit 103 of the communication control device 101 reads, for example, the type of the OS and the version of the OS included in the software information transmitted by the information processing device 202 (Step S111).

For example, in the example shown in FIG. 5, the second transmission unit 103 reads that the type of the OS is OSX and the version of the OS is 7 by referring to an item of "User-Agent" included in the HTTP message.

Next, the second transmission unit 103 of the communication control device 101 transmits the identification information of the relay device 203 to the information processing device 202 in accordance with the read software information. For example, in the case that the software information is software information representing an authorized software in the communication system (YES in Step S112), the second transmission unit 103 transmits the identification information of the relay device 203 to the information processing device 202 (Step S113).

For example, the second transmission unit 103 read authorized information including authorized software in the communication system 201 and determines whether the authorization information includes the received software information or not. In this case, the second transmission unit 103 reads the type of the OS and the version of the OS from the received software information, and determines whether or not the authorization information includes information in which the type of the OS and the version of the OS are associated. In case that the authorization information includes the received software information, the second transmission unit 103 generates the ARP reply by associating the IP address in the ARP request received from the information processing device 202, and the identification information of the relay device 203. Next, the second transmission unit 103 transmits the generated ARP reply to the information processing device 202.

In case that the software information is software information representing authorized software in the communication system 201, the information processing device 202 receives the identification information of the relay device 203. The information processing device 202 communicates based on the identification information, hereinafter.

Processing in the case of "YES" in Step S112 will be explained referring to an example of ARP. The information processing device 202 receives the ARP reply and reads the IP address and the identification information (in this case, the identification information of the relay device 203) associated with the IP address from the received ARP reply. The information processing device 202 generates ARP information in which the IP address and the received identification information are associated. Hereinafter, in case that the information processing device 202 tries to communicate with the target device 205, the information processing device 202 specifies the identification information (in this case, the identification information of the relay device 203) associated with the IP address of the relay device 203 in the ARP information. The information processing device 202 communicates with the information processing device (in the case of this example, the relay device 203) identified by the specified identification information represents.

The second transmission unit 103 carries out a process shown in Step S113 of FIG. 3. As a result, the information processing device 202 can communicate with the target device 205 via the relay device 203.

In contrast, in case that the software information is software information representing unauthorized software in the communication system 201 (NO in Step S112 of FIG. 3), the second transmission unit 103 does not carry out above-mentioned processes. For example, in case of determining that the authorization information does not include the received software information, the second transmission unit 103 does not carry out the above-mentioned processes.

In the case of NO in Step S112 of FIG. 3, the information processing device 202 communicates based on the fake identification information received in Step S122 of FIG. 4. For example, the information processing device 202 specifies the identification information (in the case of this example, the fake identification information) associated with the IP address of the relay device 203, in the ARP information. The information processing device 202 communicates with the information processing device (in the above-mentioned example, the communication control device 101) identified by the specified fake identification information. Accordingly, in this case, it is impossible that the information processing device 202 communicates with the information processing device (for example, the target device 205) via the relay device 203.

According to the above-mentioned explanation, the second transmission unit 103 determines whether the software information is authorized or not. However, a determination unit (not shown in the drawing) may carry out the above-mentioned determination. In this case, the second transmission unit 103 carries out the process, which has been explained with reference to FIG. 3, based on the determination result by the determination unit.

Next, an advantageous effect of the communication control device 101 according to the first example embodiment will be explained.

The communication control device 101 according to the first example embodiment can ensure security of the information system without significant load. A main reason is that, in case that usage of the software information transmitted by the information processing device 202 is unauthorized in the communication system 201, the communication control device 101 limits the communication which the information processing device 202 tries to carry out.

The reason why the above-mentioned effect is brought about will be explained more specifically in the following. The information processing device 202 communicates with the information processing device identified by the identification information received from the first transmission unit 102.

For example, the information processing device 202 generates ARP information in which the received identification information and the IP address assigned to the relay device 203 are associated, according to reception of the identification information of the relay device 203. In this case, the information processing device 202 communicates with the information processing device identified by the identification information associated with the IP address assigned to the relay device 203 in the ARP information. That is, in case that the identification information transmitted by the first transmission unit 102 is the identification information representing the relay device 203, the information processing device 202 can carry out the communication which is realized by relaying the relay device 203.

In contrast, in case that the identification information transmitted by the first transmission unit 102 is the identification information of the communication control device 101, the information processing device 202 generates the ARP information in which the IP address assigned to the relay device 203 and the identification information representing the communication control device 101 are associated. In this case, the information processing device 202 communicates with the communication control device 101 based on the generated ARP information. That is, the information processing device 202 cannot carry out the communication (for example, communication with the target device 205) which is realized by relaying the relay device 203.

That is, the communication control device 101 limits the communication which the information processing device 202 tries to carry out without significant load on the information processing device 202 and furthermore based on the software information transmitted by the information processing device 202.

In accordance with the communication control device 101 according to the first example embodiment, it is possible to ensure security of the information system without significant load.

Second Example Embodiment

Next, a second example embodiment of the present invention whose base is the first example embodiment will be explained.

In the following explanation, characteristic portions relating to the present example embodiment will be mainly described, and the same reference numerals are given to the same configurations as those of the first example embodiment described above, and redundant explanation will be omitted.

Figure 6:
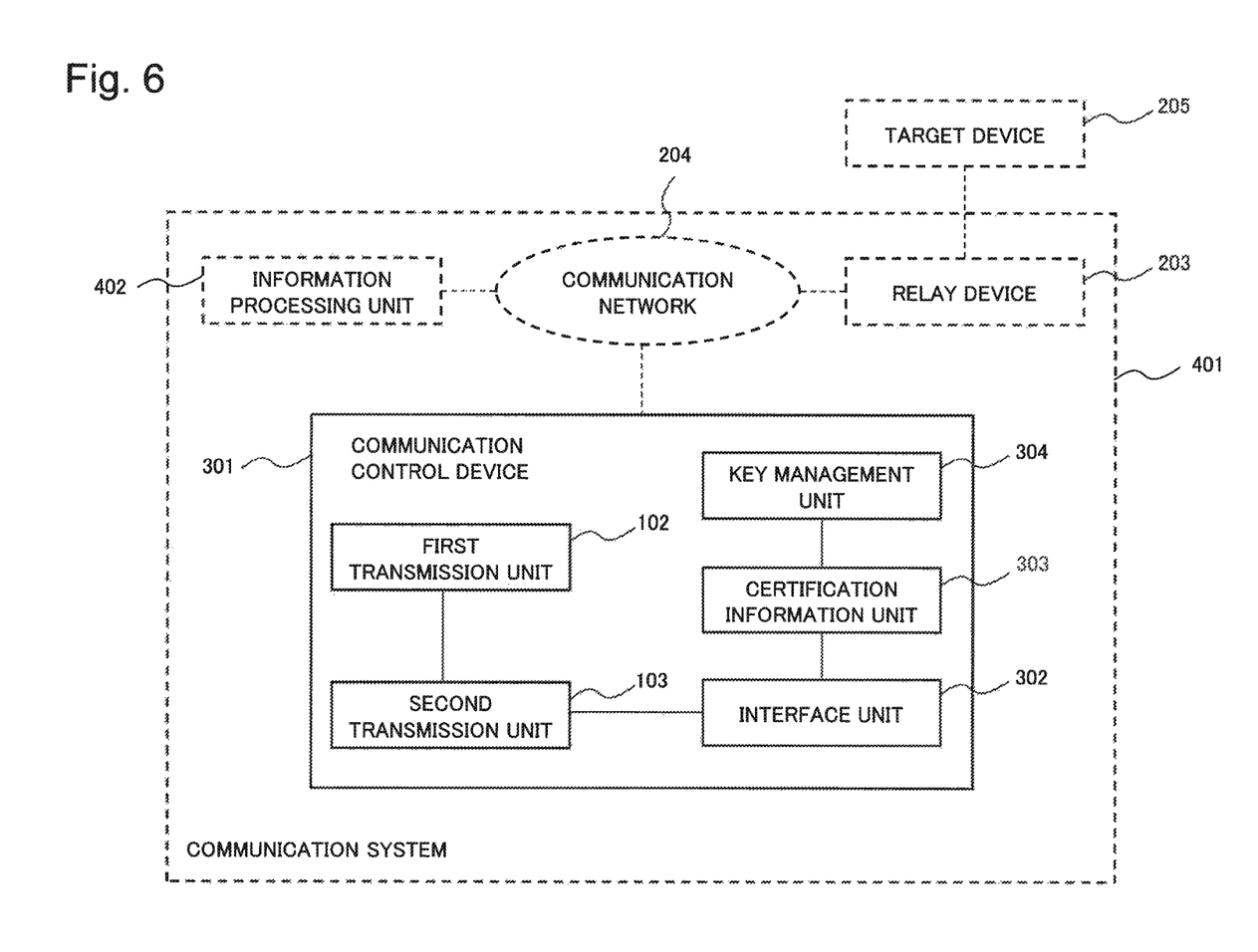
FIG. 6 is a block diagram showing the configuration of a communication control device according to a second example embodiment of the present invention.
Figure 7:
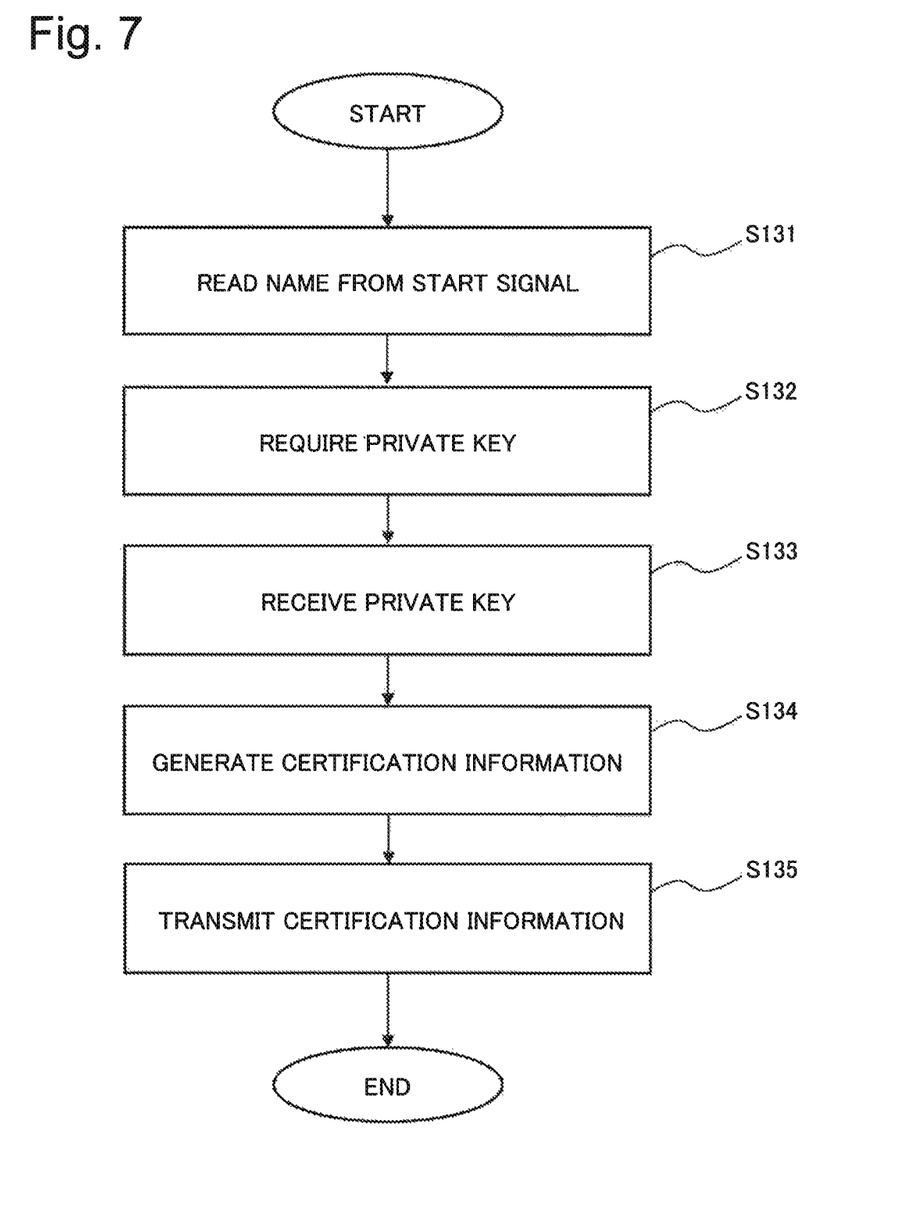
FIG. 7 is a flowchart showing processing in the communication control device according to the second example embodiment.
Figure 8:
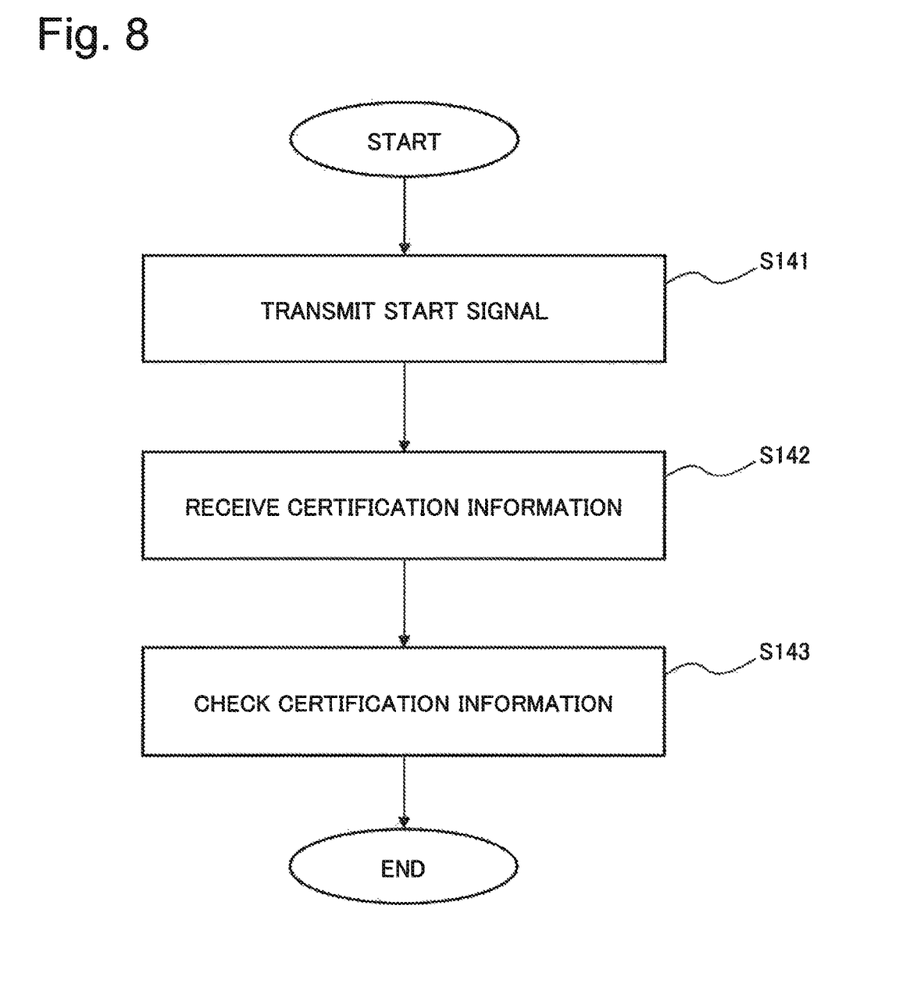
FIG. 8 is a flowchart showing processing in an information processing device.

Referring to FIG. 6 to FIG. 8, a configuration of a communication control device 301 according to the second example embodiment, and processing in the communication control device 301 will be explained in the following. FIG. 6 is a block diagram showing the configuration of the communication control device 301 according to the second example embodiment of the present invention. FIG. 7 is a flowchart showing processing in the communication control device 301 according to the second example embodiment. FIG. 8 is a flowchart showing processing in an information processing device 402.

Referring to FIG. 6, the communication control device 301 according to the second example embodiment includes the first transmission unit 102, the second transmission unit 103, an interface unit 302, a certification information unit 303 and a key management unit 304.

A communication system 401 includes the communication control device 301, the information processing device 402, the relay device 203 and the communication network 204. The communication control device 301, the information processing device 402 and the relay device 203 can communicate with each other via the communication network 204. The information processing device 402 can communicate with the target device 205 via the relay device 203.

The information processing device 402 can communicate with the target device 205 representing an information processing device which the information processing device 402 tries to communicate with, via the delay device 203. The communication control device 301, the information processing device 402 and the relay device 203 can communicate with each other via the communication network 204.

Explanation in the present example embodiment, which will be given in the following, mainly focuses on the handshake process shown in Step S123 of FIG. 4 to realize the operation of the communication system 401. Moreover, it is assumed that the Information processing device 402 communicates according to the fake identification information received in Step S122.

Referring to FIG. 8 indicating processing in the information processing device 402, the information processing device 402 for a communication control target of the communication control device 301 transmits a start signal for requiring a communication to a target within the target device 205 to the communication control device 301 (Step S141).

The start signal is, for example, a Client hello message. The information processing device 402 generates the Client hello message including encryption able to be used for communication and URL representing the target device 205 for a destination. Next, the information processing device 402 transmits the generated Client hello message to the communication control device 301.

Next, the interface unit 302 of the communication control device 301 receives the start signal, and reads a name of the target device 205 (Step S131 of FIG. 7), and outputs the read name to the certification information unit 303.

For example, the interface unit 302 receives the Client hello message, and reads FQDN representing the target device 205 from URL included in the received Client hello message. Here, FQDN represents an abbreviation of Fully Qualified Domain Name. For example, If URL is "https://aa/b/cc", the interface unit 302 reads "aa" as FQDN. Next, the Interface unit 302 transmits the read FQDN to the certification information unit 303. Next, the interface unit 302 transmits ServerHello to the information processing device 402 in response to the Client hello message.

The certification information unit 303 inputs the name outputted by the interface unit 302. Next, the certification information unit 303 transmits a request for retrieving a private key needed for generating certification information (certificate) to the key management unit 304 (Step S132).

Next, the key management unit 304 receives the request, and transmits the private key to the certification information unit 303 in response to the received request.

The certification information unit 303 receives the private key transmitted by the key management unit 304 (Step S133), and generates certification information (certificate) which represents that the communication control device 301 is a trustworthy (right and authorized) information processing device, based on the received private key and the inputted name (Step S134). Next, the certification information unit 303 adds a public key for encrypting transmitting and receiving information to the certification information. The certification information unit 303 transmits the generated certification information to the interface unit 302 (Step S135).

In the example, the certification information unit 303 receives the above-mentioned FQDN. Next, the certification information unit 303 transmits the request for the private key needed for issuing the certification information to the key management unit 304. The key management unit 304 transmits the private key to the certification information unit 303 in response to the received request. The certification information unit 303 receives the private key. The certification information unit 303 generates certification information for authorizing the communication control device 301 based on the received FQDN and the received private key and transmits the generated certification information to the interface unit 302. In this case, the certification information generated by the certification information unit 303 includes the public key for encrypting the transmitting and receiving information.

The interface unit 302 receives the certification information and transmits the received certification information to the information processing device 402 (Step S135).

For example, the interface unit 302 transmits the certification information including the public key for encrypting information to the information processing device 402 as a Certificate message.

The information processing device 402 receives the certification information (Step S142 of FIG. 8), and checks that the information processing device 402 has certification information matching the received certification information among the certification information stored by the own device (Step S143). Since the information processing device 402 has already stored the certification information issued by the certification information unit 303, the certification information stored in the own device includes the received certification information.

As a result, the information processing device 402 does not output an error representing that the communication control device 301 is not a trustworthy information processing device.

That is, by carrying out the above-mentioned processes, the information processing device 402 and the communication control device 301 carry out SSL-handshake with each other.

The information processing device 402 encrypts information by use of the public key, and communicates the encrypted information.

Next, an advantageous effect related to the communication control device 301 according to the second example embodiment will be explained.

The communication control device 301 according to the present example embodiment can ensure security of the information system without significant load. Furthermore, the communication control device 301 rarely places a burden on users for the information processing device 402. The reasons for the above mentions are a reason 1 and a reason 2 shown in the following.

(Reason 1)

The reason 1 is that the configuration of the communication control device 301 according to the second example embodiment includes the configuration of the communication control device 101 according to the first example embodiment, (Reason 2)

The reason 2 is that the information processing device 402 does not output the error related to the certification information through carrying out the above-mentioned processes.

That is, according to the example embodiment, the certification information generated by the certification information unit 303 in advance as the predetermined certification information is stored in the information processing device 402. In response to the information processing device 402's starting the communication with the own device, the certification information transmitted by the certification information unit 303 is coincident with the predetermined certification information. Accordingly, the information processing device 402 does not output the error related to the certification information.

(Hardware Configuration Example)

A configuration example of hardware resources that realize a communication control device estimation in the above-described example embodiments of the present invention using a single calculation processing apparatus (an information processing apparatus or a computer) will be described. However, the communication control device may be realized using physically or functionally at least two calculation processing apparatuses. Further, the availability analysis device may be realized as a dedicated apparatus.

Figure 9:
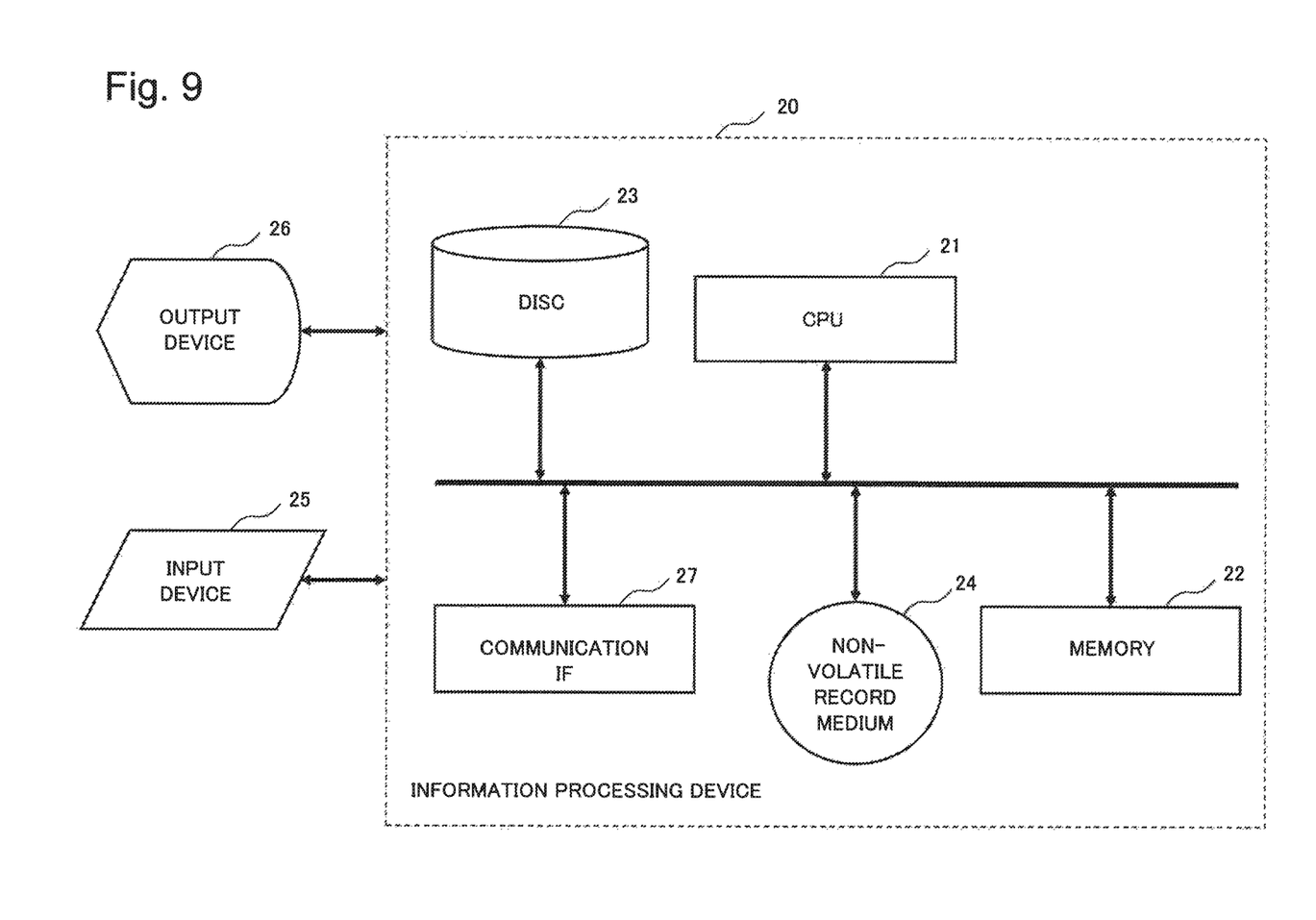
FIG. 9 is a block diagram schematically illustrating a hardware configuration of a calculation processing apparatus capable of realizing the communication control device according to each example embodiment of the present invention.

FIG. 9 is a block diagram schematically illustrating a hardware configuration of a calculation processing apparatus capable of realizing the communication control device according to each of the first to second example embodiments. A calculation processing apparatus 20 includes a central processing unit (CPU) 21, a memory 22, a disc 23, a non-transitory recording medium 24, and a communication interface (hereinafter, expressed as a "communication I/F") 27. A calculation processing apparatus 20 further includes an input apparatus 25 and an output apparatus 26. The calculation processing apparatus 20 can execute transmission/reception of information to/from another calculation processing apparatus and a communication apparatus via the communication I/F 27.

The non-volatile recording medium 24 is, for example, a computer-readable Compact Disc, Digital Versatile Disc, Universal Serial Bus (USB) memory, or Solid State Drive. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes an communication control program present on the memory 22 corresponding to a function (processing) indicated by each unit illustrated in FIG. 1, or FIG. 6 described above or an communication control program (FIG. 2, FIG. 3, FIG. 4, FIG. 7, or FIG. 8). The CPU 21 sequentially executes the processing described in each example embodiment of the present invention.

In other words, in such a case, it is conceivable that the present invention can also be made using the communication control program. Further, it is conceivable that the present invention can also be made using a computer-readable, non-transitory recording medium storing the communication control program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2014-195282, filed on Sep. 25, 2014, the disclosure of which is incorporated herein in its entirety.

REFERENCE SIGNS LIST 101 communication control device
102 first transmission unit
103 second transmission unit
201 communication system
202 information processing device
203 relay device
204 communication network
205 target device
301 communication control device
302 interface unit
303 certification information unit
304 key management unit
401 communication system
402 information processing device
21 CPU
22 Memory
23 Disk
24 Non-volatile recording medium
25 Input device
26 Output device
27 Communication IF

The invention claimed is:

1. A communication control device comprising:
hardware, including a processor and memory;
a first transmission unit implemented at least by the hardware and configured to receive a broadcast request for identification information of a relay device for relaying communication from a first information processing device and transmit fake identification information of the communication control device to the first information processing device in response to a request from the first information processing device; and
a second transmission unit implemented at least by the hardware and configured to receive software information of the first information processing device and transmit identification information of the relay device to the first information processing device when the received software information is authorized.

2. The communication control device according to claim 1, further comprising:
a determination unit implemented at least by the hardware and configured to determine whether the software information is authorized or not, wherein
the second transmission unit transmits the identification information of the relay device when the determination unit determines that the received software information is authorized.

3. The communication control device according to claim 2, wherein,
the determination unit determines whether the received software information is authorized or not, based on whether or not the received software information is included in authorization information including software information authorized in the communication control device.

4. The communication control device according to claim 3, further comprising:

an interface unit implemented at least by the hardware and configured to read a name identifying a target device for communication of the first information processing device from URL included by a start signal, and wherein a certification information unit configured to generate certification information on basis of the name.

5. An information system comprising:
the communication control device according to claim 1; and
the first information processing device, wherein
the first information processing device communicates on basis of the identification information transmitted by the communication control device.

6. The information system according to claim 5, wherein the communication control device further includes a certification information unit implemented at least by the hardware and configured to generate certification information representing that the own device is a trustworthy information processing device and transmit the generated certification information to the first information processing device in response to the first information processing device's transmitting a start signal for starting communication to an own device, wherein
the first information processing device checks that certification information stored in advance by the own device and the received certification information are coincident.

7. A communication control method by a communication device comprising:
receiving a broadcast request for identification information of a relay device for relaying communication from a first information processing device;
transmitting fake identification information of the communication control device to the first information processing device as in response to a request for identification information of the relay device from the first information processing device;
receiving software information of the first information processing device; and transmitting identification information of the relay device to the first information processing device when the received software information is authorized.

8. A non-transitory recording medium having a communication control program recorded therein, the program making a computer achieve:
a first transmission function configured to receive a broadcast request for identification information of a relay device for relaying communication from a first information processing device and transmit fake identification information of a communication control device to the first information processing device as in response to a request for identification information of the relay device from the first information processing device; and
a second transmission function configured to receive software information of the first information processing device and transmit identification information of the relay device to the first information processing device when the received software information is authorized.

9. The non-transitory recording medium having the communication control program according to claim 8, further comprising:
a determination function configure to determine whether the received software information is authorized or not, wherein
the second transmission function transmits the identification information of the relay device when the determination function determines that the received software information is authorized.

10. The non-transitory recording medium having the communication control program according to claim 9, further comprising:
the determination function determines whether the received software information is authorized or not, based on whether or not the received software information is included in authorization information including software information authorized in the communication control device.

* * * * *